US011701719B2

(12) United States Patent
Hen (10) Patent No.: US 11,701,719 B2
(45) Date of Patent: Jul. 18, 2023

(54) CUTTING INSERT ADAPTOR AND TOOL ASSEMBLY

(71) Applicant: Iscar, Ltd., Tefen (IL)

(72) Inventor: Daniel Hen, Nahariya (IL)

(73) Assignee: Iscar, Ltd., Tefen (IL)

( * ) Notice: Subject to any disclaimer, the term of this patent is extended or adjusted under 35 U.S.C. 154(b) by 837 days.

(21) Appl. No.: 16/727,188

(22) Filed: Dec. 26, 2019

(65) Prior Publication Data

US 2021/0197298 A1 Jul. 1, 2021

(51) Int. Cl.
*B23C 5/22* (2006.01)
*B23B 27/16* (2006.01)
*B23B 29/22* (2006.01)

(52) U.S. Cl.
CPC ........ *B23C 5/2252* (2013.01); *B23B 27/1614* (2013.01); *B23B 27/1662* (2013.01); *B23B 29/22* (2013.01); *B23B 2205/16* (2013.01); *B23C 5/22* (2013.01); *B23C 2210/168* (2013.01)

(58) Field of Classification Search
CPC ............ B23B 2205/04; B23B 2205/12; B23B 2205/16; B23B 2260/10; B23B 27/1614; B23B 27/1662; B23B 27/1666; B23B 29/22; B23B 27/14; B23B 2205/02; B23B 1/00; B23B 27/1681; B23C 2200/0455; B23C 2210/16; B23C 5/22; B23C 5/20; B23C 5/2252; B23C 2210/168; Y10T 407/2286; Y10T 407/2274
See application file for complete search history.

(56) References Cited

U.S. PATENT DOCUMENTS 2,779,992 A * 2/1957 Hayes .................... B23B 27/16
407/107
3,066,385 A * 12/1962 Vana ..................... B23B 27/167
407/101
3,299,491 A 1/1967 Hall
3,466,721 A * 9/1969 Binns .................. B23B 27/1666
407/70
3,548,475 A 12/1970 Fiori
(Continued)

FOREIGN PATENT DOCUMENTS

CN 201419271 Y 3/2010
EP 1920862 5/2008
WO WO 2011/157252 12/2011

OTHER PUBLICATIONS

International Search Report dated Mar. 17, 2021, issued in PCT counterpart application (No. PCT/IL2020/051261).
(Continued)

*Primary Examiner* — Sara Addisu
(74) *Attorney, Agent, or Firm* — Womble Bond Dickinson (US) LLP (57) ABSTRACT

A cutting insert adaptor for an insert pocket can include one or more pairs of opposing insert abutment surfaces and pocket abutment surfaces which converge at an acute angle. The one or more insert abutment surfaces are all rotated in the same direction, relative to their paired pocket abutment surface which in turn rotates a cutting insert abutting the cutting insert adaptor relative to an orientation the cutting insert would have if it only abutted the insert pocket instead of the cutting insert adaptor.

19 Claims, 4 Drawing Sheets

(56) References Cited

U.S. PATENT DOCUMENTS

| | | | | |
|---|---|---|---|---|
| 3,611,527 A | * | 10/1971 | Hudson | B23C 5/2208 407/104 |
| 3,703,755 A | * | 11/1972 | Guensche | B23B 27/1681 407/112 |
| 3,986,237 A | * | 10/1976 | Hertel | B23B 27/16 407/107 |
| 4,329,091 A | * | 5/1982 | Erkfritz | B23C 5/2269 407/111 |
| 4,600,341 A | | 7/1986 | Board | |
| 4,658,875 A | * | 4/1987 | Grabovac | B27G 13/04 407/41 |
| 4,714,384 A | * | 12/1987 | Lagerberg | B23B 27/1611 407/62 |
| 4,722,642 A | | 2/1988 | Musacchia, Jr. | |
| 4,730,525 A | * | 3/1988 | Kelm | B23B 27/1659 29/48.5 R |
| 4,876,932 A | * | 10/1989 | Nessel | B23B 27/1666 82/158 |
| 5,456,300 A | * | 10/1995 | Rosenkranz | B27L 11/005 241/292.1 |
| 6,623,216 B2 | * | 9/2003 | Hansson | B23B 27/1662 407/83 |
| 6,769,843 B2 | * | 8/2004 | Hansson | B23B 27/00 407/104 |
| 7,128,501 B1 | * | 10/2006 | Sipos | B23B 27/167 407/100 |
| 7,182,112 B2 | * | 2/2007 | Meados | B27G 13/04 407/41 |
| 7,347,650 B2 | | 3/2008 | Tipu | |
| 7,390,149 B2 | * | 6/2008 | Wihlborg | B23C 5/06 407/113 |
| 7,431,539 B2 | | 10/2008 | Erickson et al. | |
| 8,403,603 B2 | * | 3/2013 | Zitzlaff | B23B 29/046 407/107 |
| 8,807,884 B2 | | 8/2014 | Fang et al. | |
| 8,827,599 B2 | | 9/2014 | Henry et al. | |
| 9,492,873 B2 | * | 11/2016 | Bhagath | B23B 27/08 |
| 2007/0065240 A1 | * | 3/2007 | Berger | B25B 23/00 407/117 |
| 2008/0075542 A1 | * | 3/2008 | Van Horssen | B23B 27/1666 407/111 |
| 2008/0112767 A1 | * | 5/2008 | Huang | B23B 27/1666 407/107 |
| 2009/0285644 A1 | * | 11/2009 | Hecht | B23B 27/1622 407/5 |
| 2021/0031281 A1 | * | 2/2021 | Raboach | B23C 5/22 |
| 2022/0001458 A1 | * | 1/2022 | Rabouh | B23B 29/06 |

OTHER PUBLICATIONS

Written Opinion dated Mar. 17, 2021, issued in PCT counterpart application (No. PCT/IL2020/051261).

* cited by examiner

ND TOOL
CUTTING INSERT ADAPTOR AND TOOL ASSEMBLY

FIELD OF THE INVENTION

The invention relates to a cutting insert adaptor configured to be inserted in an insert pocket of an insert holder (also called a "cutting tool"). Specifically, it relates to a cutting insert adaptor configured for adapting a pocket of an insert holder into a pocket configured to hold a smaller cutting insert.

BACKGROUND OF THE INVENTION

According to most present technologies and standards, an insert pocket is typically designed for securing a cutting insert, typically made of cemented carbide, of a single geometry and size.

Despite the norm of an insert pocket designed for a single geometry and size of insert, there are of course exceptions, at least in theoretical patent literature. For example, U.S. Pat. No. 8,807,884 discloses an insert pocket designed to accommodate two cutting inserts having different geometries.

The present invention differs substantially from U.S. Pat. No. 8,807,884, inter alia, in that it is not directed to an insert pocket integrally formed with a tool's insert holder itself but rather a cutting insert adaptor designed to be inserted in an insert pocket between a cutting insert and said insert pocket.

U.S. Pat. No. 4,722,642 discloses a spacing adaptor configured to separate a cutting insert from walls of an insert pocket of a turning tool. The portions of the spacing adaptor which separate the cutting insert from the pocket walls are connected by a weakened portion which may be scored or reduced in dimension. The adaptor, as manufactured, is flat with the weakened portion connecting the portions adapted to separate the insert from the recess walls being provided to permit the adaptor to conform to a variety of insert configurations. The portions of the adaptor which separate the surfaces of the cutting insert from the walls of the recess have a thickness which is equal to the amount of material removed from the surfaces of the insert in one or more re-sharpening operations.

The present invention differs substantially from U.S. Pat. No. 4,722,642, inter alia, in that it is not directed to flat, equal-wall-thickness spacer designed for compensating for insert wear. Notably, re-sharpening of cutting inserts is no longer common in the modern high precision machining industry. The present invention relates to high precision industrial components and not to what could be called a basic bendable metal spacer of the type disclosed in U.S. Pat. No. 4,722,642.

U.S. Pat. No. 4,600,341 discloses a cutting insert adaptor for a standard (A.N.S.I.) insert holder. The cutting insert adaptor is configured to allow a standard insert pocket to accommodate a smaller insert of a similar or different shape. U.S. Pat. No. 4,600,341 further discloses a specialized clamping assembly for the different sized inserts.

Early development of the present invention shared similarity to a cutting insert adaptor developed for a similar function to that described in U.S. Pat. No. 4,600,341, but now facilitates a completely new machining application not conceived by the inventors of U.S. Pat. No. 4,600,341.

SUMMARY OF THE INVENTION

Typically, an appropriate insert holder and cutting insert is selected for a desired machining operation. If multiple operations are required, for example: a roughing operation followed by a finishing operation, then it is common that two different cutting insert types are used, each of which may be mounted to a respective different insert holder.

A first reason that different cutting inserts (and typically different insert holders) are used is because it is axiomatic that products which are optimized for a particular operation provide better performance than products designed for two or more different operations, since different machining requirements by the normal way of things require compromised design features.

A second reason is that additional components such as cutting insert adaptors are an additional cost.

A third reason is that increasing the number of components of a tool, decreases the user-friendliness of the tool, since there is a greater likelihood that the small components will fall during assembly or disassembly (known in the field as "falling-parts").

Finally, as a general rule, additional (i.e. non-integral) components typically reduce rigidity of the insert being secured to the insert holder, which causes a reduction in machining stability and hence reduces the finish quality of a machined piece.

Recently, the technology of additive manufacturing has advanced significantly, allowing practical manufacturing of components which were, until this time, difficult or expensive to manufacture.

While the cost of additive manufactured components is relatively expensive and precision does not yet reach the standard of traditional subtractive processes, such expense is lessened when the components are extremely small and require less precision than is typical for metal machining components. While the invention can be produced many different manufacturing methods, one preferred method is additive manufacturing.

It was theorized that cutting insert adaptors for allowing standard turning tools to accommodate smaller inserts (which are more economically efficient, where suitable for a given machining application) could now be manufactured at a cost that would offset the standard product selection of simply purchasing an additional insert holder for the appropriately sized insert. Nonetheless, the above-mentioned problem of "falling parts" still needed to be overcome and it was decided to magnetize the cutting insert adaptor to ensure the component remains in the pocket even when the insert is not secured thereto. This also overcame the problem of modifying an already existing insert holder. However, it should be understood that the present invention is not limited to standard/existing holders and hence other clamping means such as but not limited to screws (for screw holes in insert pockets), etc. could alternatively be used.

The present invention is directed to the discovery that a small cost-efficient cutting insert adaptor can allow the same insert holder and cutting insert to be used for different machining operations than they are designed for.

Accordingly, according to a first aspect of the present invention, there is provided a cutting insert adaptor for an insert pocket, the cutting insert adaptor comprising: opposite adaptor top and bottom surfaces; and an adaptor peripheral surface connecting the top and bottom surfaces; the adaptor peripheral surface comprising: a rearward-facing sub-surface; and a forward-facing sub-surface located on an opposite side of the adaptor peripheral surface to the rearward-facing sub-surface; the rearward-facing sub-surface comprising at least one pocket abutment surface; the forward-facing sub-surface comprising at least one insert abutment surface; wherein, in a top view of the cutting insert adaptor: each pair of opposing insert and pocket abutment surfaces converge at an adaptor angle α fulfilling the condition: $0° \leq \alpha \leq 30°$; and each insert abutment surface is rotated relative to its opposing pocket abutment surface in the same rotational direction.

It will be understood that the pocket abutment surfaces are intended to abut an insert pocket and the insert abutment surfaces are intended to abut a cutting insert. Consequently, by rotating the insert abutment surfaces a cutting insert abutting them is orientated in what will be called a "rotated position" i.e. rotated relative to what will be called an "unrotated position" which is a position that the cutting insert would have if it would directly abut the insert pocket's pocket support surfaces (currently abutted by pocket abutments surfaces of the cutting insert adaptor).

It will be understood that the rotation direction of each pair (to be clear "each pair" means "all pairs") of opposing surfaces must be in the same rotational direction for the cutting insert to be rotated. However, the exact amount of rotation (i.e. adaptor angle α) need not be identical for different pairs because inserts can be slightly tilted, for example, in the downwards direction near the front cutting corner, resulting in a slight different in adaptor angles between different pairs of abutment surfaces. Nonetheless, they will all have approximately the same magnitude, which, as defined in the main aspect above is within about 30° of each other and in preferred embodiments, defined below, within a smaller range than that. To elaborate, an exact value of 0° would be zero rotation and hence would not have any effect. Greater than 30 would likely rotate the insert so much, such that the insert pocket's pocket support surfaces would likely not be able to hold the insert in position due to slippage. It should be noted that the value of 30° is an estimated theoretical value, and is not inconceivable that the value may be higher, noting that there are a great many insert shapes which this invention applies too.

As an additional point, it should be understood that "each pair" may include a single pair if that is all that exists in a particular embodiment.

While the above said is stated with reference to certain abutment surfaces (specifically the insert and pocket abutment surfaces), it should be understood that the other pairs of abutment surfaces mentioned below, also may have different values to different pairs of the same types of surfaces, and also may only be a single pair in a particular embodiment.

It should also be noted that all of the adaptor angles, tool angles and the insert angles mentioned throughout the specification and claims all refer to acute angle values, whether or not the word "acute" is mentioned.

It should also be noted that the present invention has particular applicability to non-circular insert shapes, which would not provide a different machining operation after rotation.

Accordingly, the cutting insert now can provide a different machining operation in the rotated position than it would in the unrotated position.

It should also be understood that a smaller insert will presumably be used due to the use of a cutting insert adaptor thereby reducing the amount of relatively expensive material used for the cutting insert.

It will be understood that a different cutting insert adaptor (for example comprising insert abutment surfaces that are parallel with the opposing pocket abutment surfaces can alternatingly be used in the same insert pocket, and hence the same cutting insert can be used for the original machining operation that the insert pocket is designed for (with the benefit that a smaller cutting insert is useable). While this use of a cutting insert adaptor is known, the new advantage is that the same insert holder and insert pocket thereof, and the same cutting insert, can now provide the same and different machining operations just by providing a cutting insert adaptor with the cutting insert adaptor having rotated (i.e. non-parallel) abutment surfaces relative to the insert pocket.

While it is possible that the cutting insert adaptor will have a single pocket abutment surface, better stability can be achieved with exactly two pocket abutment surfaces. Notably, when it is said that there are two or more of a type of abutment surface, it means that they are spaced-apart, i.e. separated by some sort of non-linear surface therebetween, typically a relief recess (whether in a plane or at a corner of the insert pocket).

For contacting an insert, for stability, it is also preferred for a cutting insert adaptor to have exactly three insert abutment surfaces. This is because having three abutment areas is typically the most stable arrangement. In the preferred embodiment exemplified in the drawings there are actually four insert abutment surfaces. This is to allow more stability than if there would only be two (i.e. one per leg) but also to allow the cutting insert adaptor to be reversible. While this may result in the cutting insert not contacting all four insert abutment surfaces, testing so far has not found this to occur. While not being bound to theory, it is believed that there is benefit in this respect to the unusually large (asymmetrically shaped) recess provided between two legs as described below.

In view of the above, it is preferred that the cutting insert adaptor comprise exactly two pocket abutment surfaces and preferably three or four insert abutment surfaces. However, it should be understood that there may be insert shapes (and also pocket shapes) where other numbers of abutment surfaces are preferred.

The cutting insert adaptor in most preferred configurations will have a non-linear shape. For example, the cutting insert adaptor can comprise a first leg; and a second leg connected to the first leg and extending non-parallel with the first leg; wherein the first leg comprises at least one of said insert abutment surfaces and at least one of said pocket abutment surfaces, and the second leg comprises at least one of said insert abutment surfaces and at least one of said pocket abutment surfaces. In such case, it is preferred that the cutting insert adaptor comprise exactly three or exactly four spaced-apart insert abutment surfaces. When a total of three spaced-apart insert abutment surfaces are present, the first leg preferably comprises exactly two spaced-apart insert abutment surfaces and the second leg comprises exactly one insert abutment surface.

It will be understood that the invention allows a cutting insert adaptor to have any desired adaptor angle. Having said that, there is a preference that the adaptor angle not be too large so that a given insert holder can properly support the cutting forces. Accordingly, it is preferred that the adaptor angle α fulfill the condition: $2° \leq \alpha \leq 15°$, more preferably $2° \leq \alpha \leq 10°$. The upper value of the latter range (10°) is more preferred since the closer the adaptor angle α is to zero, the better the insert holder will be able to support the forces (since it is designed for an angle of zero). The lower value of the ranges (2°) is well above zero since without a significant rotation of the insert, the difference in machining is likely, although still feasible, to be less useful.

As shown, one preferred option, for at least the reasons below, is for the cutting insert adaptor to comprise one or more magnets attached thereto. This allows the cutting insert adaptor to be held in place, for example, when indexing a cutting insert, even when the insert holder is upside down. It also allows the cutting insert adaptor to be held to the insert holder without a dedicated insert pocket geometry (e.g. screw holes). It also allows the insert holder to be cleaned, e.g. with an air spray, without the cutting insert being secured to the pocket.

Preferably, the cutting insert adaptor can be 180° rotationally indexable about an index axis extending through the rearward-facing sub-surface and the forward-facing sub-surface. Stated differently, using cutting insert terminology, the cutting insert adaptor can be reversible. This can allow a cutting insert to have a first angular orientation within the insert pocket and perform a first machining operation when the cutting insert adaptor has a first orientation relative to the insert pocket. After the cutting insert adaptor is reversed (i.e., turned upside down) so that the bottom surface thereof which was previously in abutment with the insert pocket's pocket base surface is now facing the same basic direction as the pocket base surface and spaced therefrom, the cutting insert can be brought to a second angular orientation within the insert pocket for a second (different) machining operation.

According to a second aspect of the present application, there is provided a cutting tool assembly comprising: an insert holder and a cutting insert adaptor; the insert holder comprising: opposite top and bottom sides; opposite first and second lateral sides connecting the top and bottom sides; opposite front and rear sides connecting the top, bottom, first lateral and second lateral sides; an elongated shank portion defining an elongation axis; and a cutting portion connected to the shank portion; a forward direction extending parallel with the elongation axis and from the shank portion towards the cutting portion, and a rearward direction opposite to the forward direction; an upward direction defined extending from the bottom side towards the top side and being perpendicular to the elongation axis, and a downward direction opposite to the upward direction; a first lateral direction extending from the first lateral side to the second lateral side and being perpendicular to both the elongation axis and the upward direction, and a second lateral direction opposite to the first lateral direction; and an insert pocket formed in the cutting portion at an intersection of the top side, front side and first lateral side, and comprising: a pocket base surface; and at least one pocket support surface extending upwardly from the pocket base surface; the cutting insert adaptor comprising: opposite adaptor top and bottom surfaces; and an adaptor peripheral surface connecting the top and bottom surfaces; the adaptor peripheral surface comprising: a rearward-facing sub-surface; and a forward-facing sub-surface located on an opposite side of the adaptor peripheral surface to the rearward-facing sub-surface; the rearward-facing sub-surface comprising at least one pocket abutment surface; the forward-facing sub-surface comprising at least one insert abutment surface; wherein: the cutting insert adaptor is mounted to the insert pocket such that the at least one pocket abutment surface abuts the at least one pocket support surface; and in a top view of the insert holder: each pair of opposing insert abutment surfaces and pocket support surfaces converge at a tool angle β fulfilling the condition: $0° \leq \beta \leq 30°$; and each insert abutment surface is rotated relative to its opposing pocket support surface in the same rotational direction.

It will be understood that the invention allows a cutting insert adaptor to have any desired tool angle. In similarity with the explanation above with reference to opposing abutment surfaces of the cutting insert adaptor, there is also a preference that the tool angle β not be too large so that a given insert holder can properly support the cutting forces. Accordingly, it is preferred that the tool angle β fulfill the condition: $2° \leq \beta \leq 15°$, more preferably $2° \leq \beta \leq 10°$.

It will be understood that there are standard tool assemblies configured to work in a first machining direction using one cutting edge, and also a second machining direction using a different cutting edge of the same cutting insert. Accordingly, the cutting edges together with the tool assembly can be configured to present the same angle relative to the workpiece for both machining directions. According to one innovation of the present invention, a more optimal orientation of a cutting edge (e.g. a smaller angle for better finish) can be provided for one machining direction, leaving the other cutting edge with a less optimal angle. While there is an advantage (e.g. better finish in one direction) and a disadvantage (e.g. a worse finish in the other direction) this is still believed to be overall advantageous since for many machining jobs there may be one machining direction used far more often than the other, or the other may be less important for finish. If, e.g. finish, is still important in the other direction, the cutting insert adaptor can be reversed to provide the advantageous effect for the other direction while still using the same cutting insert. This is defined below in terms of a first acute insert angle ε1 and a second acute insert angle ε2, which in turn are defined in terms of the sides of the insert holder, however it should be understood that the essence is the concept explained above. Alternatively, the invention can be defined relative to a workpiece to be machined, i.e. a method of machining in a particular direction with the sub-edges of the cutting edge being defined as below.

As will become clear from the above-said, improved finish in a desired machining direction is an advantageous application conceived for the present application, nonetheless, as mentioned above, there may be other desired combinations (e.g. using the same cutting insert for both a 90° or close to 90° machining angle, and alternating the cutting insert adaptor (or using a different cutting insert adaptor, to allow the same cutting insert to provide a chamfer angle, e.g. 45°, etc.).

It should be understood that a primary advantage of the invention is that a manufacturer can keep in stock only a single cutting insert instead of two or more different types/shapes of cutting inserts and still provide different machining operations, allowing ease of purchasing logistics, stock maintenance, etc. While the new need for an additional part or parts, i.e. the cutting insert adaptors is needed for this advantage, since such components do not participate directly in machining the workpiece it is expected they will have a long tool life and hence will need to be replaced more rarely than cutting inserts.

The tool assembly can comprise a cutting insert mounted to the insert pocket. The cutting insert can have any desired geometry. For defining the above concept, the cutting insert can comprise: insert top and bottom surfaces, an insert peripheral surface connecting the insert top and bottom surfaces; and a cutting edge formed along an intersection of the insert top surface and the insert peripheral surface; the insert peripheral surface comprising a plurality of insert peripheral side surfaces and a plurality of peripheral corners connecting the insert peripheral side surfaces; the cutting edge comprising: a first sub-edge extending along a first insert peripheral side surface of the plurality of insert peripheral side surfaces; a second sub-edge extending along a second insert peripheral side surface of the plurality of insert peripheral side surfaces; the second peripheral side surface being adjacent the first peripheral side surface; and a corner sub-edge connecting the first and second sub-edges and extending along one of said peripheral corners which is located between the first and second peripheral side surfaces.

According to a preferred embodiment, in a top view of the tool assembly; a first acute insert angle ε1 is subtended between the first sub-edge and the rearward direction; and a second acute insert angle ε2 is subtended between the second sub-edge and the first lateral direction; wherein the first insert angle ε1 and second insert angle ε2 fulfill the condition: ε1≠ε2.

For machining with better finish in the forward direction, the first insert angle ε1 should form a wiper angle. Therefore, preferably the first insert angle ε1 fulfills the condition: 0°≤ε1≤2°, more preferably 0°≤ε1≤1°, and most preferably 0.25°≤ε1≤0.75°.

Alternatively, for machining with better finish in a lateral direction, the second insert angle ε2 should form a wiper angle. Therefore, preferably the second insert angle ε2 fulfills the condition: 0°≤ε2≤2°, more preferably 0°≤ε2≤1°, and most preferably 0.25°≤ε2≤0.75°.

It will be understood that a cutting insert adaptor may be reversible thereby allowing such wiper angles to be provided by the same cutting insert adaptor, cutting insert and insert holder, simply by reversing the cutting insert adaptor in an insert pocket.

It can be seen from the foregoing, that unique methods of machining a workpiece according to the present invention can be achieved.

For example, according to a third aspect of the present application, there is provided one such method including the following steps: A first step in which the cutting insert adaptor is mounted to an insert pocket in an initial position (more precisely, the cutting insert adaptor's one or more pocket abutment surfaces abutting the insert pockets one or more pocket support surfaces); a second step in which a cutting insert is clamped to the insert pocket (more precisely at least the cutting insert's peripheral surface abutting the cutting insert adaptor's at least one insert abutment surface); a second step where machining is carried out in a first direction; a third step where the cutting insert is unclamped from the insert pocket and the cutting insert adaptor is reversed; a fourth step where a different or preferably the same cutting insert is mounted to the insert pocket; and a fifth step where machining is carried out in a second direction different to the first direction.

Stated differently, such method may thus facilitate making an initial finish cut in one direction of movement and then a subsequent finish cut in a different direction of movement.

BRIEF DESCRIPTION OF THE DRAWINGS

For a better understanding of the invention and to show how the same may be carried out in practice, reference will now be made to the accompanying drawings, in which.

DETAILED DESCRIPTION OF THE INVENTION

Figures 1A, 1B:
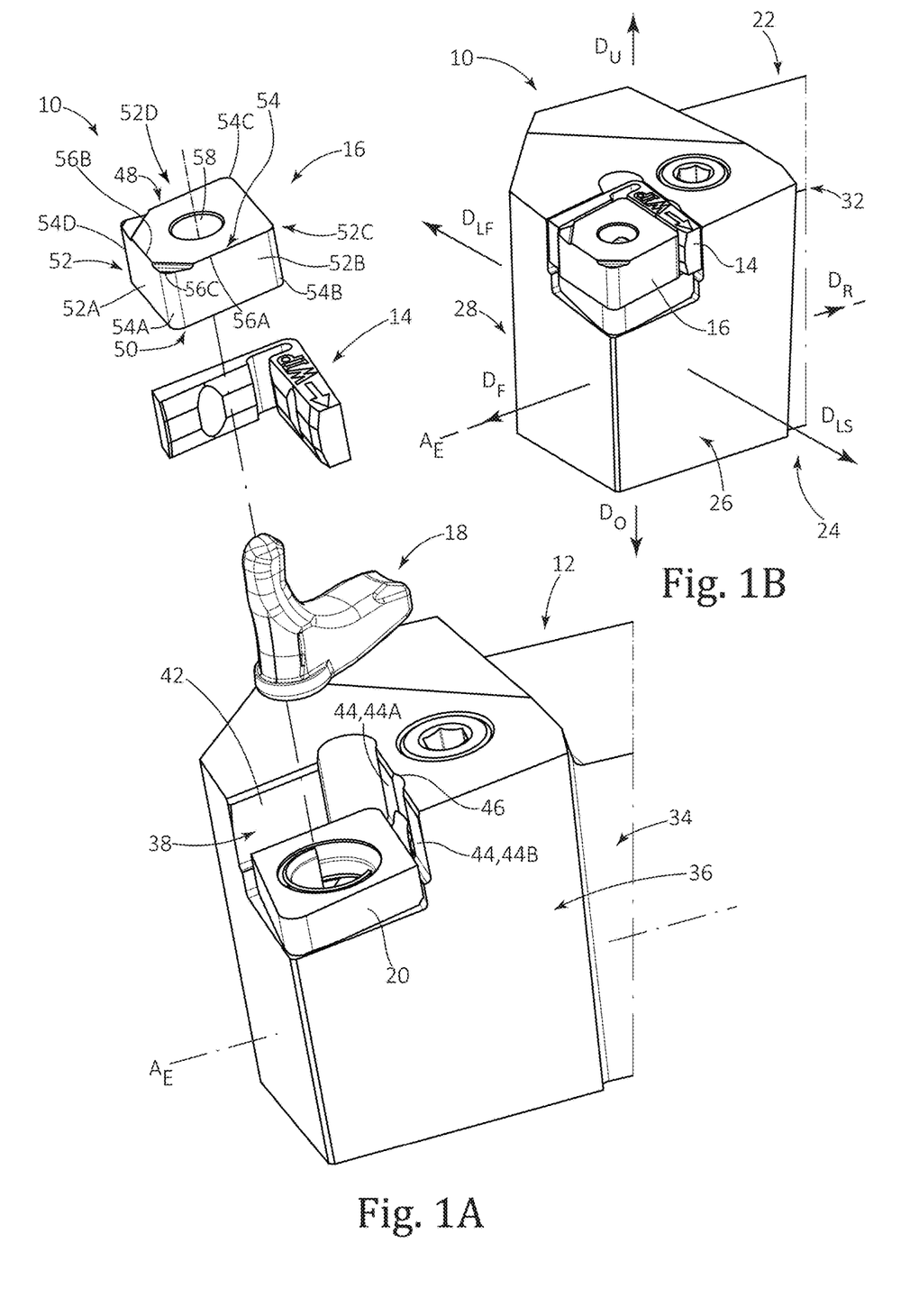
FIG. 1A is an isometric exploded view of a tool assembly including an insert holder, cutting insert, lever, shim, screw and a cutting insert adaptor according to the invention.
FIG. 1B is an isometric view of the tool assembly of FIG. 1A.

Attention is drawn to FIGS. 1A and 1B showing an exemplary tool assembly 10. In the preferred yet non-limiting embodiment shown, the tool assembly 10 exemplified is a turning tool assembly 10.

It will be understood that any type of tool with pockets could conceivably be used, however the change of operation is particularly applicable and/or advantageous to turning tools more than rotating tools since the direction of work is more linear.

The tool assembly 10 comprises an insert holder 12 and a cutting insert adaptor 14.

In the present specification, merely for purposes of appropriate claim scope, the term "tool assembly" is defined without requiring a cutting insert 16, however a cutting insert 16 and clamping means 18 (such as a "lever 18") can be included as elements comprised by the tool assembly 10.

However, it will be noted that, in theory, clamping means, such as a lever or a top-clamp (the latter is not shown in the drawings) may be preferred over the viable clamping means option of a screw (not shown), since they can more strongly bias a cutting insert towards a cutting insert adaptor than a screw (which can be biased, for example, with an offset hole) improving stability.

Other standard/optional items such as the pocket base shim 20 etc. will not be described in detail.

The insert holder 12 exemplified comprises opposite top and bottom sides 22, 24, opposite first and second lateral sides 26, 28, and opposite front and rear sides 30, 32. It should be understood that while the shank portion exemplified has a square cross section, it could be a different cross section such as circular, rectangular, etc. Nonetheless, the directions are for understanding the invention and not for limiting the claim scope to a particular tool.

The insert holder 12 further comprises an elongated shank portion 34 defining an elongation axis $A_E$ and a cutting portion 36 formed with an insert pocket 38.

Extending parallel with the elongation axis are opposite forward and rearward directions $D_F$, $D_R$, also shown are opposite upward and downward directions $D_U$, $D_D$, opposite first and second lateral directions $D_{LF}$, $D_{LS}$.

The insert pocket 38 exemplified is formed at an intersection of the top side 22, front side 30 and first lateral side 26.

It will be understood that the first lateral side could alternatively be on the opposite side, depending on whether the tool is a so-called right or left-handed tool, and that the position exemplified is for conceptual purposes only.

The insert pocket 38 comprises a pocket base surface 40 and first and second pocket support surfaces 42, 44 extending upwardly therefrom. One of the pocket support surfaces, in this example the second pocket support surface 44, comprises first and second sub-support surfaces 44A, 44B separated by a relief recess 46 to create a standard three-point contact for a cutting insert. The first and second sub-support surfaces 44A, 44B are considered part of a single pocket support surface 44 since they are co-planar and adjacent to each other.

It will be understood that there are some insert shapes which are supported by only a single pocket support surface, and some which are supported by three pocket support surfaces. The present example is directed to the most common arrangement of two pocket support surfaces, in this case configured for a standard square-shaped cutting insert.

Accordingly, the cutting insert 16 exemplified here is a standard square-shaped cutting insert.

The cutting insert 16 comprises insert top and bottom surfaces 48, 50 and an insert peripheral surface 52.

A cutting edge 54 is formed along an intersection of the insert top surface 48 and the insert peripheral surface 52.

It will be understood that the cutting insert 16 may also have an additional cutting edge at an intersection of the insert bottom surface 50 and the insert peripheral surface 52. And other types of inserts may have cutting edges along the peripheral surface, yet only the above described cutting edge 54 will be detailed, since the main purpose here is to better understand the invention.

The insert peripheral surface 52 comprises a plurality of insert peripheral side surfaces 52A, 52B, 52C, 52D (i.e. sub-surfaces) and a plurality of peripheral corners 54A, 54B, 54C, 54D.

The cutting edge 52 comprises a first sub-edge 56A and a second sub-edge 56B which are connected by a corner sub-edge 56C.

The cutting insert 16 is formed with a clamp through hole 58. It will be understood that cutting inserts such as those clamped, for example, by top-clamps, do not require clamp through holes.

As shown in FIG. 1B, the cutting insert adaptor 14 gives an appearance of an upwardly extending shim. This allows a smaller cutting insert 16 to be used in the insert pocket 38.

Figure 2A:
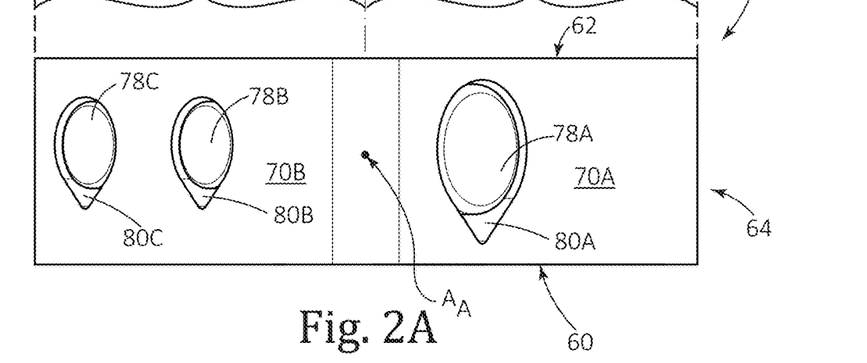
FIG. 2A is a rear view of the insert holder in FIG. 1A.
Figure 2B:
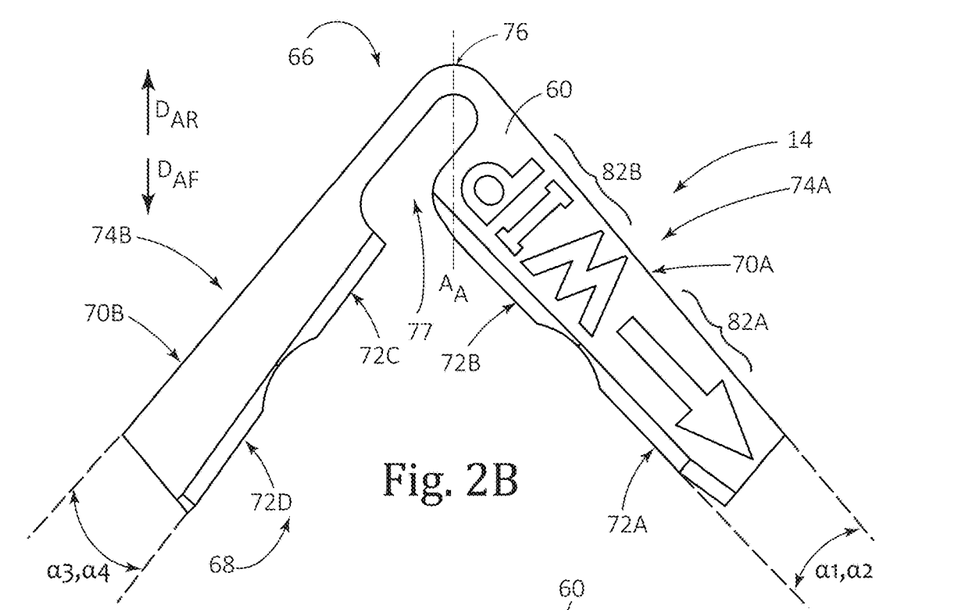
FIG. 2B is a top view of the insert holder of FIG. 2A.
Figure 2C:
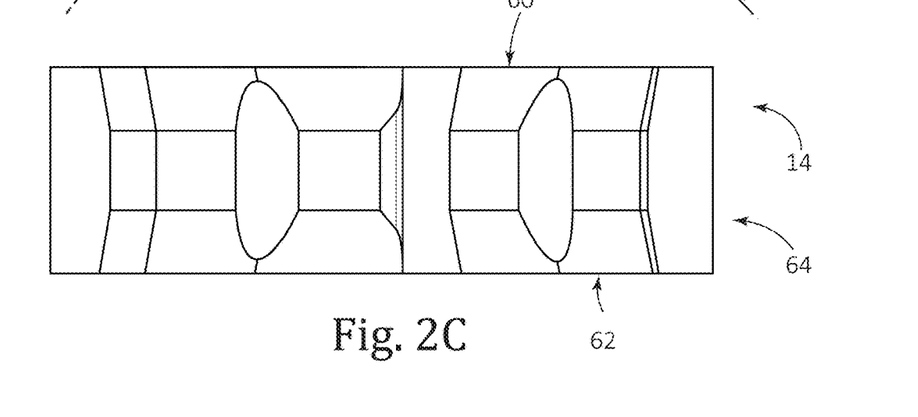
FIG. 2C is a front view of the insert holder of FIG. 2A.

Referring also to FIGS. 2A to 2C, the cutting insert adaptor 14 comprises opposite adaptor top and bottom surfaces 60, 62 and an adaptor peripheral surface 64.

The adaptor peripheral surface 64 comprises a rearward-facing sub-surface 66 and a forward-facing sub-surface 68. The rearward-facing sub-surface 66 may be referred to as a "pocket-wall-facing" sub-surface while the forward-facing sub-surface 689 may be referred to as "insert-facing" sub-surface.

The rearward-facing sub-surface 66 comprises first and second pocket abutment surfaces 70A, 70B for abutting the insert pocket 38.

The forward-facing sub-surface 68 comprises first, second, third and fourth insert abutment surfaces 72A, 72B, 72C, 72D for abutting the cutting insert 16.

More precisely, the cutting insert adaptor comprises first and second legs 74A, 74B extending non-parallel with each other (i.e. connected at bend 76). In the top view of FIG. 2B, the cutting insert adaptor 14 is chevron-shaped and comprises first and second legs 74A, 74B which meet at a bend 76. The bend 76 is provided with a recess 77 defining a connecting wall, to allow for a predetermined amount of flex between the two legs 74A, 74B.

The recess 77 is provided to allow flexibility. An initial design had a standard symmetrical recess. Subsequently it was discovered that the additive manufactured part required more flexibility than a similar designed part of the same material yet produced by traditional subtractive manufacturing methods. Accordingly, it was found preferable that the recess 77 is asymmetrically shaped. More precisely, a preferred shape is that the recess 77 is elongated. In this example the recess 77 is elongated in a parallel direction with one leg (in this example the second leg 74B).

In this example the bend 76 is in the center of the cutting insert adaptor and has an index axis $A_A$ passing therethrough.

In this example the cutting insert adaptor comprises three magnets 78A, 78B, 78C, advantageously at least one magnet in each leg (for optimal stability). In this example they are affixed by glue in first, second and third magnet recesses 80A, 80B, 80C. For extra strength, a larger magnet 78A was embedded in the first leg 74A and two smaller magnets 78B, 78C were embedded in the second leg 74B.

After having described above the details of the exemplary embodiment, referring particularly to the top view shown in FIG. 2B, the basic concept of the present invention will now be explained.

As shown, opposing insert abutment surfaces and pocket abutment surfaces are non-parallel. In this context, "opposing" insert abutment surfaces and pocket abutment surfaces are formed on opposite sides of the same leg 74A, 74B and face in generally but not precisely opposite directions.

To elaborate for this specific example there are two pairs of opposing abutment surfaces on the first leg 74A, namely the first insert abutment surface 72A and the first pocket abutment surface 70A constitute a first pair of opposing abutment surfaces; and the second insert abutment surface 72B and the same first pocket abutment surface 70A constitute a second pair of opposing abutment surfaces.

In this example the first pocket abutment surface 70A extends uninterrupted opposite to both the first and second abutment surfaces 72A, 72B, consequently being paired with both of them. If this would not be the case, for example if the middle of the first pocket abutment surface 70A would comprise a relief recess (not shown) in the center thereof or would not extend in a straight line, the first insert abutment surfaces 72A would be paired with the opposing portion of the first pocket abutment surface 70A designated merely for understanding as "82A", and the second insert abutment surfaces 72B would be paired with the opposing portion designated "82B". However, in the given example the pairing is as initially described, and since both the first and second abutment surfaces 72A, 72B extend in a common plane, both the first and second pairs form an identical acute adaptor angles α1, α2 having a value of 4.5°.

It should be noted that the angles in all drawings are not to scale and may be artificially enlarged for ease of visibility.

On the second leg 74B, the above-described understanding (if there would be a relief surface formed in the second pocket abutment surface 70B, etc.) is also applicable and will not be repeated. The third insert abutment surface 72C and the second pocket abutment surface 70B constitute a third pair of opposing abutment surfaces; and the fourth insert abutment surface 72D and the same second pocket abutment surface 70B constitute a fourth pair of opposing abutment surfaces. Both the third and fourth pairs form an identical acute adaptor angle α3, α4 having a value of 3.5°.

Accordingly, all of the adaptor angles (α1=4.5°; α2=4.5°, α3=3.5°, α4=3.5°) fulfill the condition 0≤α≤30°.

As seen in the top view of the cutting insert adaptor 14 (FIG. 2B), the first and second legs 74A, 74B taper, relative to the bend 76. Thus, on the first leg 74A, the first and second insert abutment surfaces 72A, 72B and the opposing first pocket abutment surface 70A converge in a direction away from the bend 76. Meanwhile, on the second leg 74B, the third and fourth insert abutment surfaces 72C, 72D and the opposing second pocket abutment surface 70B converge in a direction toward the bend 76.

Figures 2D, 2E, 3:
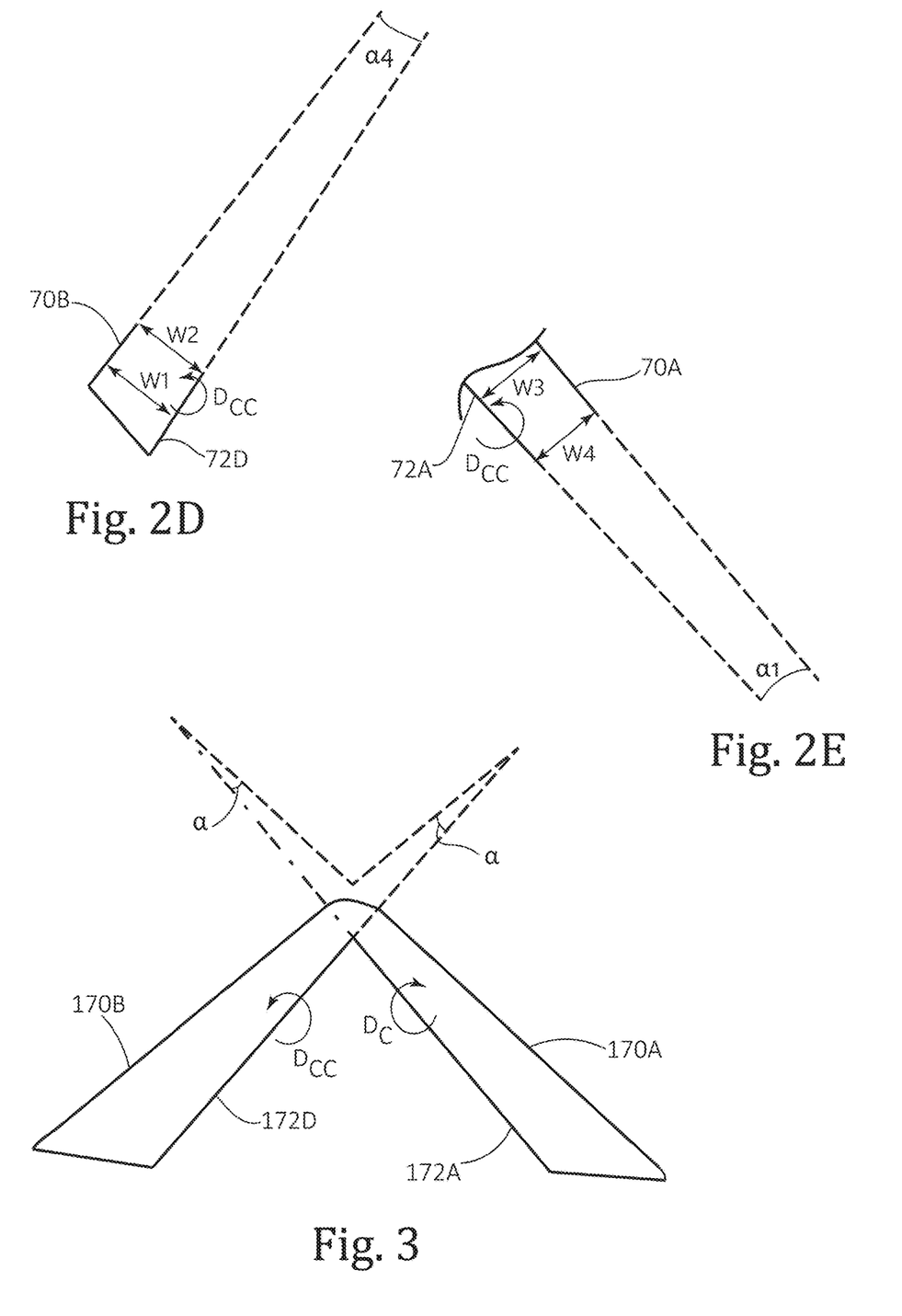
FIG. 2D is a schematic top view of the bottom left hand portion of the insert holder as shown in FIG. 2B.
FIG. 2E is a schematic top view of the bottom right hand portion of the insert holder as shown in FIG. 2B.
FIG. 3 is a schematic top view of a design not in accordance with the present invention, shown for explanatory purposes only.

Referring now to FIG. 2D, and shortly after FIG. 2E, it will be explained what is meant by all of the adaptor angles being within a particular angle range when measured in the same (i.e., "common") rotational direction.

Referring first to FIG. 2D, the opposing pair of abutment surfaces 70B, 72D are non-parallel (the fourth pair being exemplified in this figure, but the same is correct for each pair). More specifically, the fourth insert abutment surface 72D and its opposing second pocket abutment surface 70B converge towards a top of the drawing sheet. Stated differently, a first width W1 is greater than a second width W2, the second width W2 being closer to the top of the drawing sheet.

Using the second pocket abutment surface 70B as a reference (since the insert abutment surfaces are those which are rotated to provide a cutting insert a new rotated position), it is shown that the fourth insert abutment surface 72D is rotated in a counterclockwise direction $D_{CC}$ relative to the opposing second pocket abutment surface 70B (i.e. the second width W2 is smaller than the first width W1, noting that the fourth insert abutment surface 72D follows a straight line).

Referring to FIG. 2E, the first insert abutment surface 72A is also rotated in the same direction, i.e. a counterclockwise direction $D_{CC}$, relative to the reference opposing first pocket abutment surface 70A. As shown, a third width W3 is greater than a fourth width W4, the third width W3 being closer to the top of the drawing sheet.

The significance of all of the pairs of opposing surfaces being rotated in the same direction (i.e. the insert abutment surfaces being rotated in the same direction relative to their paired opposing pocket abutment surfaces) will be understood in view of FIG. 3 which exemplifies what is not intended by the present invention.

An insert abutment surface 172D is rotated in a counterclockwise direction $D_{CC}$ relative to an opposing pocket abutment surface 170B in a similar manner to that shown in FIG. 2D with similar surfaces.

However, an insert abutment surface 172A is rotated in a clockwise direction $D_C$ relative to an opposing pocket abutment surface 170A, which is a rotational direction opposite to that shown in FIG. 2E.

As a result, a cutting insert (not shown) to be mounted in abutment with the insert abutment surfaces 172A, 172D is not rotated but rather would be squeezed. And since the cutting insert is a rigid body, only a thinner cutting insert would then be appropriate to use with such adaptor insert. Yet the purpose of the present invention is not to merely use a different shaped cutting insert but to rotate a cutting insert for a different machining orientation than the orientation provided by the insert pocket alone without a cutting insert adaptor.

It should be understood, that the essence of the invention is to provide a cutting insert adaptor configured to support the same cutting insert in different rotated positions, each rotated position characterized by a different insert angle and suitable for a different type and/or direction of machining.

Figure 4A:
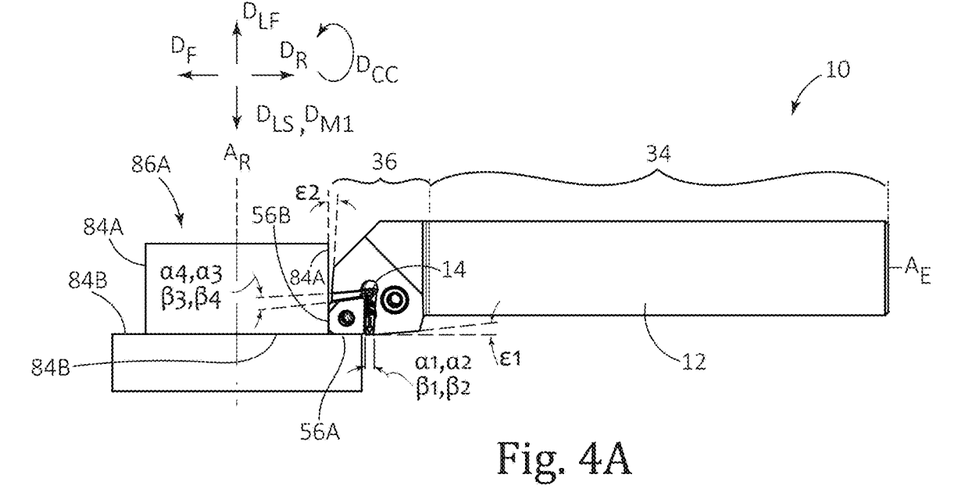
FIG. 4A is a top view of the tool assembly of FIG. 1A, further showing a workpiece, the tool assembly machining the workpiece in a lateral direction.
Figure 4B:
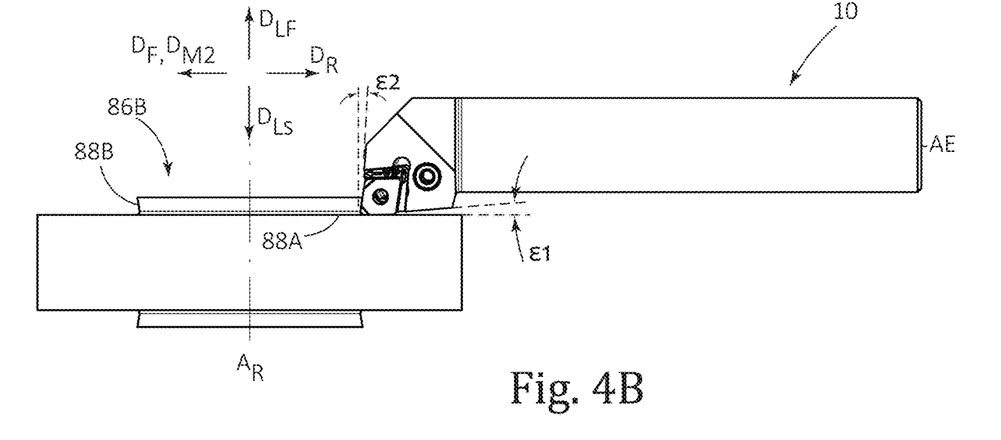
FIG. 4B is a top view of the tool assembly of FIG. 1A, further showing a workpiece, the tool assembly machining the workpiece in a forward direction and the cutting insert adaptor reversed (flipped) relative to the position shown in FIG. 4A.
Figure 4C:
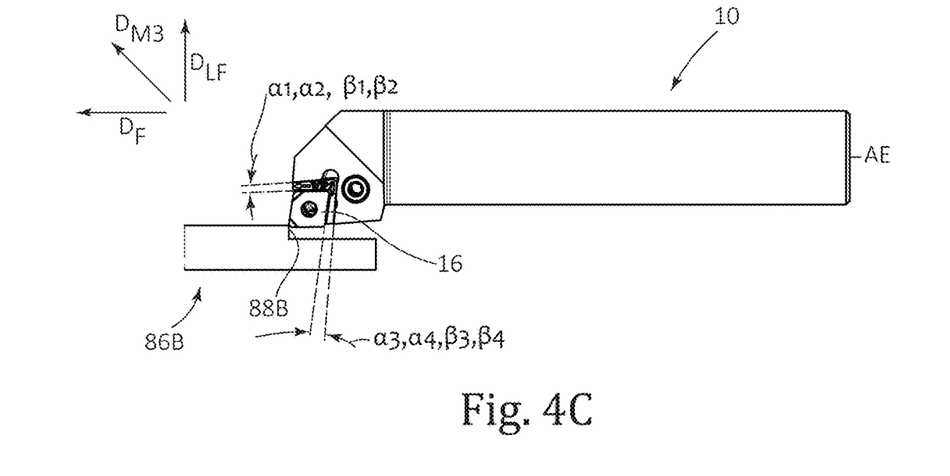
FIG. 4C is a similar view to FIG. 4B except with the tool assembly machining the workpiece in both a forward and lateral direction simultaneously.

To understand the specific example of a cutting insert adaptor configured to provide a better finish on a rotating workpiece (although this is the preferred configuration, it should be noted that rotation is relative and it will be understood that it is possible to rotate a tool while a workpiece remains static), attention is drawn to FIGS. 4A to 4C.

First referring to FIG. 4A in which the cutting insert adaptor 14 is shown in the same orientation as the top view as in FIG. 2B, and the tool assembly 10 is machining a workpiece designated as "86A". Accordingly, in this view, the cutting insert 16 is rotated slightly in a counterclockwise direction $D_{CC}$ relative to a non-rotated position it would have occupied, had it directly abutted the insert pocket's pocket support surfaces 42, 44, with no intervening cutting insert adaptor 14.

To elaborate, theoretically, in the unrotated position, the cutting edge's first sub-edge 56A would present a first acute insert angle ε1 subtended between the first sub-edge 56A and the rearward direction $D_R$ of 5° (the rearward direction $D_R$ being parallel with the tool holder's elongation axis $A_E$).

However, as per the invention, due to the cutting insert 16 being rotated in the counterclockwise direction $D_{CC}$ by about 3.5° (noting a slight discrepancy due to the cutting insert 16 also being tilted downwardly in the insert pocket 38 at the front corner) the first acute insert angle ε1 in this non-limiting example is about 8.5°.

Similarly, theoretically, in the unrotated position, the cutting edge's second sub-edge 56B would present a second acute insert angle ε2 subtended between the second sub-edge 56B and the first lateral direction $D_{LF}$ of 5°.

However, due to the counterclockwise rotation of 3.5° the second acute insert angle ε2 in this non-limiting example is about 1.5°.

Accordingly, since the tool assembly 10 moves in a first machining direction $D_{M1}$ (which in this example is the same direction as the second lateral direction $D_{LS}$) the small second acute insert angle ε2 causes the machined surface 84A (i.e. the primary machining surface 84A) to have better finish than would be the case in the unrotated position.

For better finish the second acute insert angle ε2 can more preferably be smaller as detailed above in the preferred ranges.

It should be noted that the view of the cutting edge 54 is slightly obscured by the workpiece 86A which should be understood to be schematic for explanation purposes.

The above said is most applicable for machining applications where the primary machining direction ("primary" meaning the direction of machining which is used in the machining operation most for a particular part to be machined) is parallel to a rotation axis $A_R$ of the workpiece as shown in FIG. 4A, and more particularly the same as the second lateral direction $D_{LS}$ (or if the tool is the other hand, then the opposite direction the first lateral direction $D_{LF}$).

Stated differently, the above said is most applicable where the primary machining surface 84A is basically parallel with the rotation axis $A_R$ of the workpiece 86A (i.e. as opposed a second machining direction, which in this example is perpendicular with the rotation axis $A_R$). This is because there is a compromise in that machining in the forward direction $D_F$ (i.e. along a secondary machining surface 84B which in this example extends basically perpendicular to the rotation axis $A_R$ of the workpiece 86A) is expected to provide a lower finish since the first acute insert angle ε1 is now larger than would be the case in the unrotated position. However, it is theorized that many applications have a primary machining direction, hence the compromise is believed overall beneficial.

Additionally, if the cutting insert adaptor 14 is reversed better finish can then be achieved for machining in the forward direction $D_F$.

Referring to FIG. 4B, in which a different workpiece 86B is being machined, the exact same cutting insert adaptor 14 is shown mounted in a reversed position, i.e. relative to the position shown in FIG. 4A. By reversed, it is meant that the cutting insert adaptor 14 has been rotated 180° about the index axis $A_4$ (FIG. 2A), such that the so-called "bottom surface 60" is now upwardly facing and the so-called "top surface 62" is now abutting the shim 20 (FIG. 1A), i.e., the cutting insert adaptor 14 is turned "upside down" with the pocket abutment surfaces 70A, 70B and their corresponding legs 74A, 74B switched around.

Accordingly, the angle values have been reversed with the first acute insert angle ε1 being about 1.50 and the second acute insert angle ε2 being about 8.5°. Since the tool assembly 10 moves primarily in the machining direction $D_{M2}$ (which in this example is the same direction as the forward direction $D_F$) the small first acute insert angle ε1 causes the machined surface 88A (the primary surface in this example being designated 88A and is the surface perpendicular to the workpiece's rotation axis $A_R$) to have better finish than would be the case in the unrotated position.

It will also be noted that in FIG. 4B the secondary machining surface 88B may be produced with an, in some cases, undesirable slant or chamfer, relative to the rotation axis $A_R$.

Referring to FIG. 4C, such slanted secondary surface 88B can be formed, in this example, as a typically more desirable right angled surface, i.e. parallel with the first lateral direction $D_{LF}$, by moving the tool assembly 10 in both the forward direction $D_F$ and the first lateral direction $D_{LF}$ simultaneously, resulting in the machining direction $D_{M3}$. Thus, if desired, in this example, a desired surface parallel with the rotation axis $A_R$ can be achieved.

For the sake of completeness, it should be understood that while the rotation described was done in terms of the first and second insert angles ε1, ε2, which are referenced in relation to the elongation axis $A_E$, the rotation could be described in different ways.

For example, referring to FIG. 4C, it is understood that the insert 16 is rotated by the differing adaptor angles α1, α2, α3, α4 described above in connection with FIGS. 2A-2E.

Similarly, referring now to FIGS. 1A, 2B and 4A, the rotation could also be expressed in terms of tool angles.

To elaborate, for this specific example there are two pairs of opposing abutment surfaces in connection with the first leg 74A and the insert pocket's second pocket support surface 44, namely the opposing first insert abutment surface 72A and the second sub-support surface 44B, constitute a first pair converging at a first tool angle β1 (FIG. 4A); and the opposing second insert abutment surface 72B and the first sub-support surface 44A, constitute a second pair converging at a second tool angle β2 (FIG. 4A).

Since both the first and second insert abutment surfaces 72A. 72B extend in a common plane, and in the given example the second pocket support surface 44 is parallel with the first pocket abutment surface 70A, the first and second tool angles β1, β2 are identical to the adaptor angles α1, α2 and also have a value of 4.5°.

Regarding the second leg 74B, there are third and fourth pairs, namely the opposing third insert abutment surface 72C and the first pocket support surface 42, constitute a third pair converging at a third tool angle β3 (FIG. 4A); and the opposing fourth insert abutment surface 72D and the first pocket support surface 42, constitute a fourth pair converging at an angle β4 (FIG. 4A).

Since both the third and fourth insert abutment surfaces 72C, 72D extend in a common plane, and in the given example the first pocket support surface 42 is parallel with the second pocket abutment surface 70B, the third and fourth tool angles β3, β4 are identical to the adaptor angles α3, α4 and also have a value of 3.5°.

It should be understood that this invention was conceived for the ability to provide a finish application in a desired machining direction, or alternatively in different machining direction by reversing a cutting insert adaptor or using a different cutting insert adaptor, all while using a reduced size (compared to the cutting insert size the insert pocket is designed for) and only requiring a single cutting insert type. As mentioned above the desired application may be for a different orientation (i.e. not finish, e.g. chamfer) and hence the angle ranges chosen will be significantly different.

It should also be understood that while the cutting insert adaptor embodiment shown is reversible (i.e. 180° rotationally indexable about an index axis extending through the rearward-facing sub-surface and the forward-facing sub-surface) this is only a preferred option.

What is claimed is:

1. A cutting insert adaptor for an insert pocket, the cutting insert adaptor comprising:
   opposite adaptor top and bottom surfaces;
   an adaptor peripheral surface connecting the top and bottom surfaces, and comprising:
      a rearward-facing sub-surface; and
      a forward-facing sub-surface located on an opposite side of the adaptor peripheral surface to the rearward-facing sub-surface;
      the rearward-facing sub-surface comprising at least one pocket abutment surface;
      the forward-facing sub-surface comprising at least one insert abutment surface;
   a first leg; and
   a second leg connected to the first leg and extending non-parallel with the first leg;
   wherein:
      the first leg comprises at least one of said insert abutment surfaces and at least one of said pocket abutment surfaces; and
      the second leg comprises at least one other of said insert abutment surfaces and at least one other of said pocket abutment surfaces; and
   wherein, in a top view of the cutting insert adaptor:
      each pair of opposing insert and pocket abutment surfaces converge at a non-zero adaptor angle α fulfilling the condition: $0°<\alpha\leq30°$;
      each insert abutment surface is rotated relative to its opposing pocket abutment surface in the same rotational direction.

2. The cutting insert adaptor according to claim 1, wherein there are exactly two pocket abutment surfaces.

3. The cutting insert adaptor according to claim 1, wherein there are exactly three insert abutment surfaces.

4. The cutting insert adaptor according to claim 1, wherein there are exactly four insert abutment surfaces.

5. The cutting insert adaptor according to claim 1, wherein said adaptor angle α fulfills the condition: $2°\leq\alpha\leq15°$.

6. The cutting insert adaptor according to claim 5, wherein said adaptor angle α fulfills the condition: $2°\leq\alpha\leq10°$.

7. The cutting insert adaptor according to claim 1, further comprising one or more magnets attached thereto.

8. The cutting insert adaptor according to claim 1, further being 180° rotationally indexable about an index axis extending through the rearward-facing sub-surface and the forward-facing sub-surface.

9. A cutting tool assembly comprising:
an insert holder and a cutting insert adaptor;
the insert holder comprising:
opposite top and bottom sides;
opposite first and second lateral sides connecting the top and bottom sides;
opposite front and rear sides connecting the top, bottom, first lateral and second lateral sides;
an elongated shank portion defining an elongation axis; and
a cutting portion connected to the shank portion;
a forward direction extending parallel with the elongation axis and from the shank portion towards the cutting portion, and a rearward direction opposite to the forward direction;
an upward direction defined extending from the bottom side towards the top side and being perpendicular to the elongation axis, and a downward direction opposite to the upward direction;
a first lateral direction extending from the first lateral side to the second lateral side and being perpendicular to both the elongation axis and the upward direction, and a second lateral direction opposite to the first lateral direction; and
an insert pocket formed in the cutting portion at an intersection of the top side, front side and first lateral side, and comprising:
a pocket base surface; and
at least one pocket support surface extending upwardly from the pocket base surface;
the cutting insert adaptor comprising:
opposite adaptor top and bottom surfaces;
an adaptor peripheral surface connecting the top and bottom surfaces, and comprising:
a rearward-facing sub-surface; and
a forward-facing sub-surface located on an opposite side of the adaptor peripheral surface to the rearward-facing sub-surface;
the rearward-facing sub-surface comprising at least one pocket abutment surface;
the forward-facing sub-surface comprising at least one insert abutment surface;
a first leg; and
a second leg connected to the first leg and extending non-parallel with the first leg;
wherein:
the cutting insert adaptor is mounted to the insert pocket such that the at least one pocket abutment surface abuts the at least one pocket support surface;
the first leg comprises at least one of said insert abutment surfaces and at least one of said pocket abutment surfaces;
the second leg comprises at least one other of said insert abutment surfaces and at least one other of said pocket abutment surfaces; and
in a top view of the insert holder:
each pair of opposing insert abutment surfaces and pocket support surfaces converge at a non-zero tool angle $\beta$ fulfilling the condition: $0°<\beta\leq30°$; and
each insert abutment surface is rotated relative to its opposing pocket support surface in the same rotational direction.

10. The tool assembly according to claim 9, wherein said tool angle $\beta$ fulfills the condition: $2°\leq\beta\leq15°$.

11. The tool assembly according to claim 10, wherein said tool angle $\beta$ fulfills the condition: $2°\leq\beta\leq10°$.

12. The tool assembly according to claim 11, further comprising a cutting insert mounted to the insert pocket, the cutting insert comprising:
insert top and bottom surfaces,
an insert peripheral surface connecting the insert top and bottom surfaces; and
a cutting edge formed along an intersection of the insert top surface and the insert peripheral surface;
the insert peripheral surface comprising a plurality of insert peripheral side surfaces and a plurality of peripheral corners connecting the insert peripheral side surfaces;
the cutting edge comprising;
a first sub-edge extending along a first insert peripheral side surface of the plurality of insert peripheral side surfaces;
a second sub-edge extending along a second insert peripheral side surface of the plurality of insert peripheral side surfaces;
the second peripheral side surface being adjacent the first peripheral side surface; and
a corner sub-edge connecting the first and second sub-edges and extending along one of said peripheral corners which is located between the first and second peripheral side surfaces;
wherein, in a top view of the tool assembly:
a first acute insert angle $\varepsilon1$ is subtended between the first sub-edge and the rearward direction; and
a second acute insert angle $\varepsilon2$ is subtended between the second sub-edge and the first lateral direction; and
wherein the first acute insert angle $\varepsilon1$ and the second acute insert angle $\varepsilon2$ fulfill the condition: $\varepsilon1 6 \varepsilon2$.

13. The tool assembly according to claim 12, wherein said first acute insert angle $\varepsilon1$ fulfills the condition: $0°<\varepsilon1\leq2°$.

14. The tool assembly according to claim 13, wherein said first acute insert angle $\varepsilon1$ fulfills the condition: $0.25°\leq\varepsilon1\leq0.75°$.

15. The tool assembly according to claim 12, wherein said second acute insert angle $\varepsilon2$ fulfills the condition: $0°<\varepsilon2\leq2°$.

16. The tool assembly according to claim 15, wherein said second acute insert angle $\varepsilon2$ fulfills the condition: $0.25°\leq\varepsilon2\leq0.75°$.

17. The insert adaptor according to claim 1, wherein in said top view of the insert adaptor:
the second leg is connected to the first leg at a bend;
in the first leg, the at least one insert abutment surface and the opposing at least one pocket abutment surface converge in a direction away from the bend; and
in the second leg, the at least one insert abutment surface and the opposing at least one pocket abutment surface converge in a direction towards the bend.

18. The tool assembly according to claim 9, wherein in said top view of the tool assembly:
the insert adaptor's second leg is connected to the insert adaptor's first leg at a bend;
the at least one insert abutment surface and the opposing at least one pocket support surface converge in a direction away from the bend; and
in the second leg, the at least one insert abutment surface and the opposing at least one pocket support surface converge in a direction towards the bend.

19. A cutting insert adaptor for an insert pocket, the cutting insert adaptor comprising:
opposite adaptor top and bottom surfaces;
an adaptor peripheral surface connecting the top and bottom surfaces, and comprising:

a rearward-facing sub-surface; and
a forward-facing sub-surface located on an opposite side of the adaptor peripheral surface to the rearward-facing sub-surface;
the rearward-facing sub-surface comprising at least one pocket abutment surface;
the forward-facing sub-surface comprising at least one insert abutment surface;
a first leg; and
a second leg connected to the first leg and extending non-parallel with the first leg;
wherein:
the first leg comprises at least one of said insert abutment surfaces and at least one of said pocket abutment surfaces; and
the second leg comprises at least one of said insert abutment surfaces and at least one of said pocket abutment surfaces; and
wherein, in a top view of the cutting insert adaptor:
the insert adaptor's second leg is connected to the insert adaptor's first leg at a bend;
in the first leg, the at least one insert abutment surface and the opposing at least one pocket abutment surface converge at a first non-zero adaptor angle, in a direction away from the bend; and
in the second leg, the at least one insert abutment surface and the opposing at least one pocket abutment surface converge at a second non-zero adaptor angle, in a direction towards the bend.

* * * * *